Dec. 3, 1963    R. M. NESTER    3,112,650
PRESSURE MEASURING DEVICE
Filed June 1, 1960    3 Sheets-Sheet 1

INVENTOR
RALPH MILLER NESTER

BY *C. H. Mortenson*
ATTORNEY

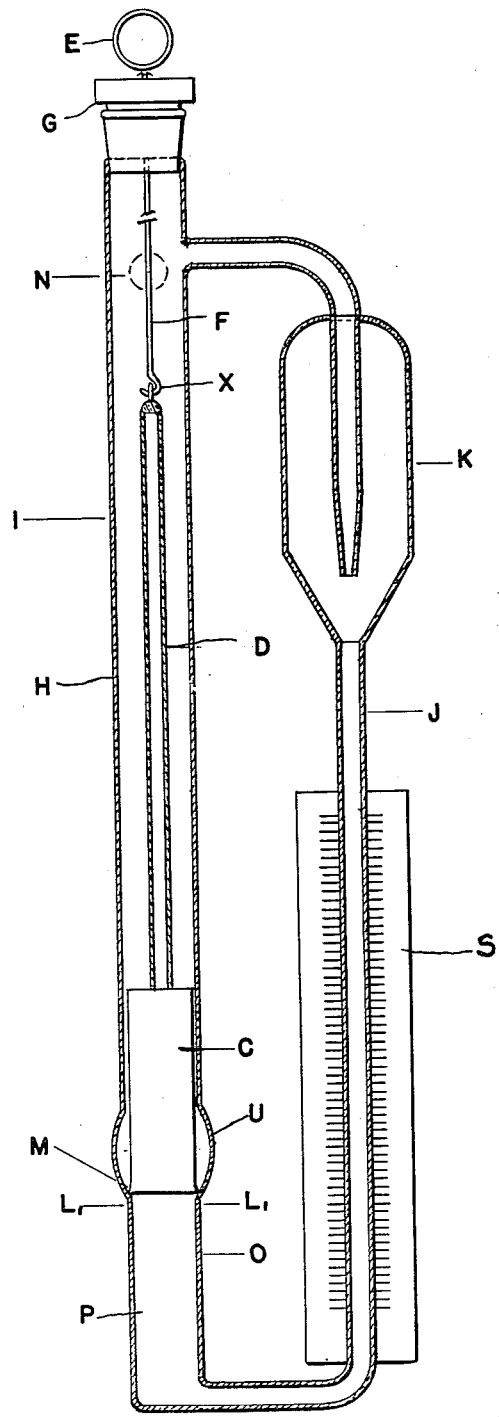

Dec. 3, 1963  R. M. NESTER  3,112,650
PRESSURE MEASURING DEVICE
Filed June 1, 1960  3 Sheets-Sheet 3
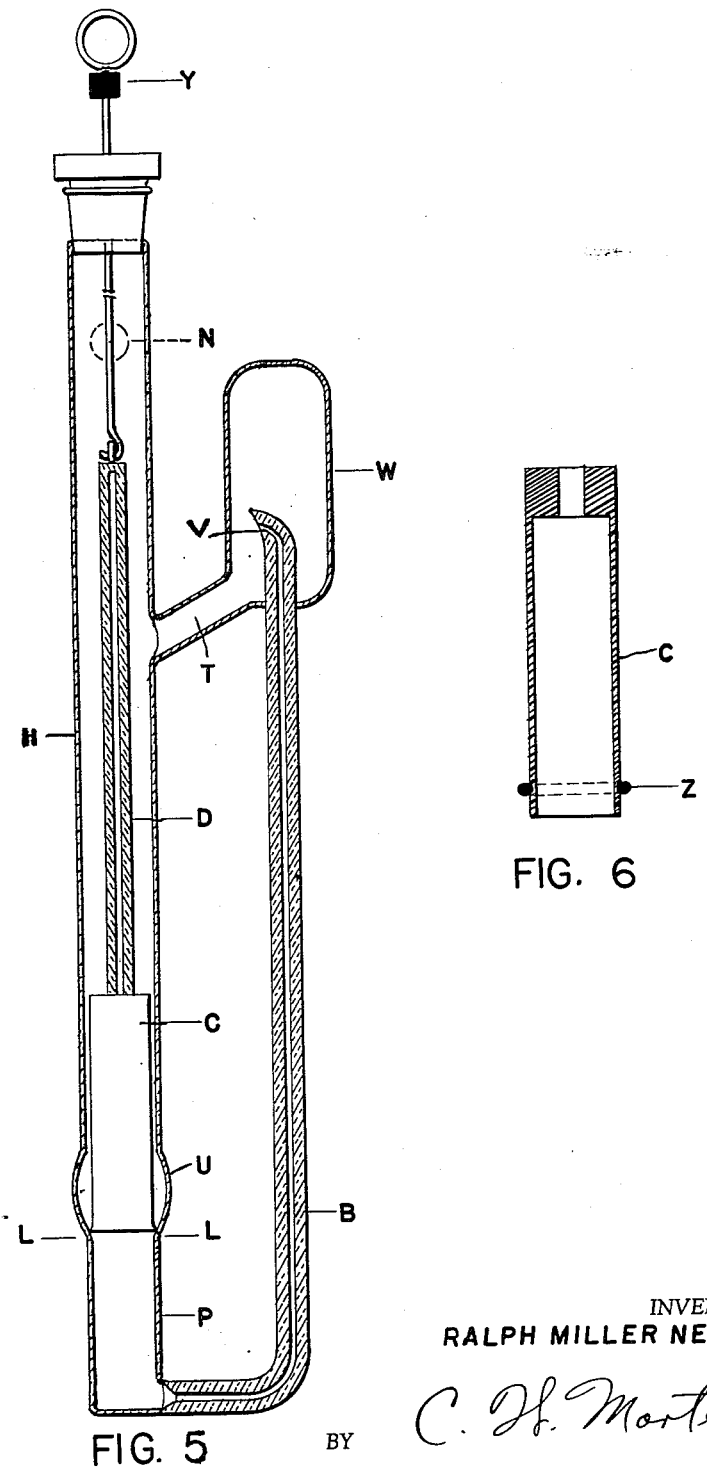
INVENTOR
RALPH MILLER NESTER
BY C. H. Mortensen
ATTORNEY

United States Patent Office 3,112,650
Patented Dec. 3, 1963

3,112,650
PRESSURE MEASURING DEVICE
Ralph M. Nester, Fauk and Crestfield Roads,
Wilmington 3, Del.
Filed June 1, 1960, Ser. No. 33,213
9 Claims. (Cl. 73—400)

The present invention relates to the art of vacuum gauges. More particularly, it relates to a gauge which not only provides for quickly measuring vacuums but affords accuracy and is constructed for cleaning with facility.

This application is a continuation-in-part of my copending application Serial No. 4,525, filed on January 25, 1960, now abandoned.

The principal object of this invention is a new and improved vacuum gauge which is characterized by simplicity of construction, ease in reading and operation, with accompanying increased accuracy, and can be cleaned with a minimum of difficulty. Additional objects will be appreciated from the following detailed description of the invention.

This invention is a vacuum gauge comprising a tubular glass body provided with a capillary side arm, and disposed within said tubular body, a precise true-bore capillary provided with a piston type reservoir a its lower end. The true-bore capillary is moveable within the tubular body, so that upon moving the true-bore with the attached reservoir downwardly in the tubular body mercury in the bottom of the latter is forced up into the reservoir and true-bore, compressing any gas present. At the same time mercury will rise in the side arm capillary. Since the tubular body has an outlet to the vacuum system to be measured, a reading can be obtained on the calibrated true-bore.

This part of the invention may be understood more readily by referring to the various figures in the drawing:

FIGURE 4 is a sectional elevation of an assembled embodiment of this invention.

FIGURE 5 is a sectional elevation of another embodiment; and

FIGURE 6 is a sectional detail of the hollow section of the pump mechanism.

Figure 1:
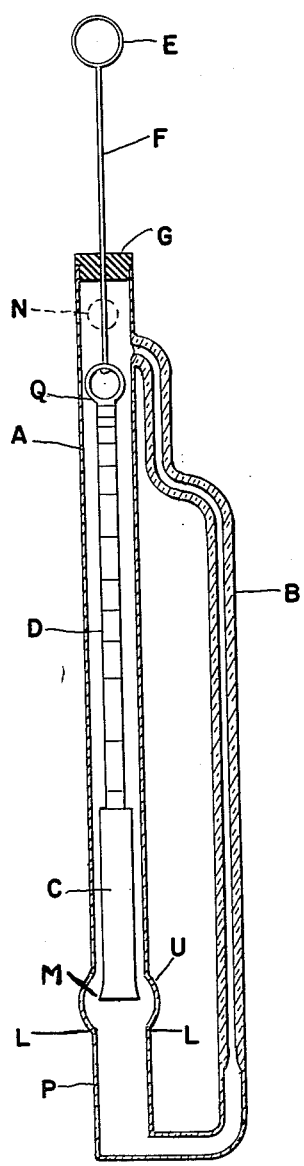
FIGURE 1 is a sectional elevation of an assembled gauge.

With reference to the drawings in greater detail, FIGURE 1 shows the tubular body A, to which is sealed the capillary side-arm B. Outlet N is provided in A, for connection to any vacuum system to be measured. Disposed within body A, is the true-bore capillary D sealed to the precisely and easily machined piston type reservoir C which has a lower edge M which is tapered to a feather edge having a slightly greater diameter than that of C. The piston type reservoir C is sealed to the glass capillary D by heating the reservoir and inserting the glass capillary D cold. Since the coefficient of expansion of the plastic is greater, the reservoir contracts over the glass giving a vacuum tight seal after cooling. The glass capillary D and the reservoir C are also tapered to facilitate a better fit. The bottom of A contains mercury in the precise true-bore P. The plunger F shown in FIGURE 2, has ball E at its upper end and hook X at its lower end. Plug G is mounted on F giving a vacuum tight seal, preferably being a plug made of silicone rubber lubricated with grease. Hook X connects F to the glass ring R on capillary D.

The assembly is made largely of Pyrex glass, except the rod F which is preferably of tungsten, ball E of any suitable metal preferably soldered to the rod, rubber plug G which is preferably of silicone rubber, and reservoir C preferably of plastic, such as nylon, poly(tetrafluoroethylene), polythene, polyformaldehyde or the like.

In operation of the gauge, mercury is filled to the level L, and ball E is pushed down to obtain a reading. This lowers the capillary D and the reservoir C, forcing mercury into the precision machined piston type reservoir C, and up into the calibrated glass capillary D, compressing the gas; at the same time mercury rises in the arm B. The metal ball is further depressed until the mercury in capillary B reaches a level or height even with or equal to the height or level of the mercury in the inner bore of capillary D. The vacuum reading is then taken from the mercury level in the calibrated capillary D.

The capillary D is calibrated in any convenient range from 0.00001 mm. Hg to 20 mm. Hg. Two examples of these are ranges of 0.001 mm. Hg to 20 mm. Hg and 0.00001 mm. Hg to 6 mm. Hg.

Examples of the dimensions of the feathered edge M and the lower bore P, are 0.529 inch for M, and 0.521 inch for diameter of P. Naturally, the plastic of M is compressed to enter P.

While the above embodiment of the invention is very useful, there are further embodiments which are encompassed by this invention and certain advantages are gained. For example, the plunger of this invention is readily used in manometers. The conventional manometers are very difficult to clean. To clean the conventional manometer the operator must go through a complicated boiling-out procedure which is so troublesome that frequently the gauge is discarded and a new one is purchased. Further, McLeod gauges, which are generally used for measuring lower pressures, are not continuous reading and in most cases do not exceed 20 mm. in their pressure readings. By applying the principles of this inveniton described above to manometer-type gauges, a new type manometer which is easy to fabricate, is easily operated and is easily cleaned is attained. Cleaning, as applied to present manometers involves actual cleaning of the glass and removal of any entrapped gas or moisture in the dead-end leg of the manometer. This operation is vastly simplified in the new manometer.

The manometer-gauge of this invention comprises a tubular glass body provided with a side arm with mercury trap. Attached to the side arm is a moveable scale which is graduated in millimeters, or it may be calibrated in millimeters directly onto the side arm. Within the tubular glass body is an 8 mm. glass tube with the piston type reservoir of this invention at its lower end. The 8 mm. glass capillary and the reservoir are moveable within the glass body, so that downward movement of the tube and reservoir forces mercury into the reservoir and up into the glass capillary.

Figure 2:
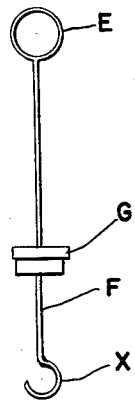
FIGURE 2 is a detail, in elevation, of the plunger mechanism.
Figure 3:
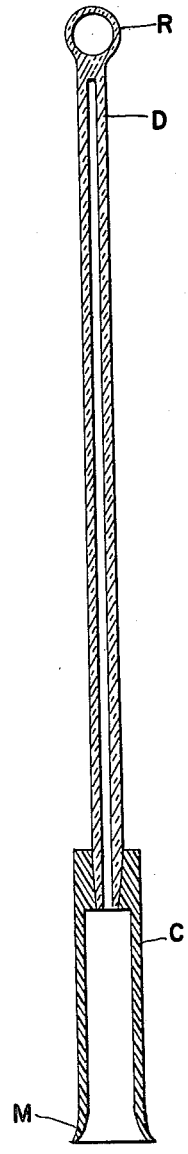
FIGURE 3 is a sectional detail of the true-bore capillary with reservoir attached.

This gauge of this invention may more readily be understood by referring to various figures in the drawing. FIGURE 4 shows the assembled manometer. The plunger arrangement used is as shown in FIGURES 1–3 and while the reservoir and calibrated glass capillary are essentially the same they are modified slightly in the adaptation. For example, since the scale is on the side arm, the calibrated glass capillary is replaced by an ordinary glass capillary and the precision-machined piston type reservoir is shortened in length to accommodate a smaller volume.

Referring to the drawings in greater detail, FIGURE 4 shows the tubular body H to which is sealed the side arm J with trap at K for trapping mercury. Outlet N is provided in H for connection to the system to be measured.

A millimeter scale S is either calibrated on J, or calibrated on a flat scale which is attached to side arm J for the measurement of pressure. Disposed within body H is the capillary D and the piston type reservoir C which has a lower edge M which is tapered to a feather edge having a slightly greater diameter than that of C and O. The piston type reservoir C is sealed to the glass capillary D by the expansion method described above. The bottom of H contains mercury in the precise true-bore O. The plunger F shown in FIGURE 2 has ball E at its upper end and hook X at its lower end. Plug G is mounted on F giving a vacuum tight seal with the opening to H. Hook X connects F to the glass ring in capillary D.

In operation in the initial use or in cleaning, as to get rid of trapped gases or moisture, mercury is filled to level $L_1$, while the piston type reservoir is kept above the mercury level. The manometer is then evacuated to below 20 mm. mercury. The ball E is pushed down thus forcing the glass capillary D and the precision machined piston type reservoir C downwardly also. Mercury is forced into reservoir C and up into the capillary D. The ball E is depressed further until the mercury rises to any point in the glass capillary D which point is any level in D corresponding to a point or level in the side arm J. That is, the mercury in D and that in J are at the same level. The remaining gas trapped in capillary D is removed by tilting the manometer in a counterclockwise direction until the mercury completely fills the capillary D. The remaining gas rises back thru the capillary D and the piston type reservoir C thru the side arm J. The manometer is then rotated to the vertical position forming the dead-end leg of ordinary manometers. The evacuating source is then removed, and system may be opened to atmosphere.

In use to make a reading on a system under vacuum, the vacuum source being placed on outlet N, the reading is taken from calibrated side arm J as increasing evacuation causes the mercury level to rise in J. The side arm J may be calibrated in a range 0 to 760 mm. mercury, or the calibrated range may be on a plate which is attached to the said side arm J.

With reference to the comment made above on McLeod gauges, it is desired to explain in an additional manner the manner in which readings are taken using the gauge shown in FIGURE 1. In the operation of that gauge, the user lowers the plunger until the top-most end of D is at the same level as the mercury in B. In so doing, gas is trapped within the capillary of D so that the mercury level is some finite distance below the seal at the top end of D. With the sealed end Q, or zero, at the same level as the liquid in B, the distance between the zero Q end of D to the mercury level below it is the vacuum attained. Thus, for accuracy it is necessary to make sure the described balance is made. While this is readily achieved, an automatic reading is desirable.

To provide for such readings, the gauge shown in FIGURE 1 is equipped with an automatic overflow. Upon moving the reservoir downwardly, the operator does so until the he notes the flow of liquid upwardly in the side arm B is such to fill the side arm and flow over into the main pool P. In so doing, gas is trapped within D under compression. The mercury level now in D is equal to the vacuum in the system being tested and the operator needs only to read the scale (not shown) on D to get the value. The need for the level balancing described above is eliminated and the operator is not required to hold the plunger element in a given, balanced position.

Thus, the modified vacuum gauge with automatic zeroing shown in FIGURE 5 is similar to that first described but is equipped with an overflow trap. It also usually has an adjustable cylindrical collar Y that fits over rod F to make readings even more rapidly. The action and method of operation, however, are similar to those previously described.

To illustrate the operation of the gauge, mercury is filled to the level L, and ball E is pushed down to obtain a reading. This lowers the capillary D and reservoir C, forcing mercury into the precision machined piston type reservoir C, and up into the calibrated glass capillary D, compressing the gas. At the same time, mercury rises in the side arm B. The ball E is further depressed until the mercury in the side arm B overflows in the trap W and returns through T and H to the pool P. The ball E is further depressed until the top of the inner bore of capillary D is at the same level as the overflow point V in trap W. The collar Y is then moved to the rubber plug G and locked into position by tightening the set screw. This approximates the final positions for the accurate readings to be taken during the use of the gauge. The gauge is now ready for operation, and raising and lowering of the plunger system from time to time as is required will give, accurately and rapidly, the measure of the vacuum prevailing at the time of reading. The height to which the inner capillary D is lowered is governed by the collar Y. The reading is then taken from the mercury level in the calibrated capillary D.

In the reservoir the feathered edge may be replaced by a rubber O ring arrangement as shown in FIGURE 6. The difference is that the feathered edge M of the reservoir is replaced by a suitable synthetic O ring Z made of such plastics as nylon, poly(tetrafluoroethylene), or various rubbers such as neoprene and forming a compression seal so that mercury will not flow around and up above the O ring in the reservoir in the precise bore lower section.

Another method of making this compression seal is to make the previously proposed piston type reservoirs out of glass with a precision ground outer surface. The feathered edge is excluded. The lower true-bore section P is also precisely ground on the inner surface. This forms a compression seal so that mercury will not flow around and above the reservoir in the lower section P. Normally, the flared edge or the O ring seal is used.

It will be noted that expansion area U can be of a variety of shapes. This area facilitates the movement of the piston and provides for free flowing of mercury or such other liquid as is used back into the pool P. This also facilitates lifting the hollow section C above the liquid level in P to allow C and D to become filled with whatever gas is in the system.

The various components which have been referred to as being made of glass, such as the capillaries and tubes, may be made of plastic materials if desired, and the entire assembly of tubes, side arms, traps and overflows may be molded in a single operation as well as being assembled separately by blowing and fusing techniques. Preferably, these elements which can be constructed of glass are so made and scales are placed directly on such parts.

From the above it can be seen that this invention comprises a vacuum gauge which contains a piston pump. This is slideably mounted in the main tube of the gauge and it is made up of a hollow member that coacts with the bore of the bottom section of the main tube to force the liquid, usually mercury, up into a side arm, which preferably has or is an overflow tube, and up into the hollow member. This member may have attached to it a capillary tube the passage way of which connects with that of the lower hollow section. Thus, the liquid will rise in the capillary and this capillary may be calibrated so that vacuum readings are obtained directly. So that overflowing liquid can freely fall to the main pool there is provided a section, near the bottom part of the main tube, which section is of greater diameter than the main providing a clearance between the outside surfaces of the widest parts of the hollow member and the walls of the main tube.

While the invention has been disclosed herein in connection with certain embodiments and certain structural and precedural details, it is clear that changes, modifications or equivalents can be used by those skilled in the

I claim:

1. A pressure gauge for measuring low gas pressure which gauge comprises a tubular body; a tubular side arm connected near the top and near the bottom of said tubular body in passage-way relationship therewith; a piston having a hollow section at one end thereof and being slideably mounted in and in sealed relationship to said tubular body; means for allowing the movement of said piston up and down while in said sealed relationship with said tubular body, said movement downwardly being to force liquid in said tubular body up into said hollow section of said piston and up into the bore of said side arm; and means for reading the pressure being measured.

2. A gauge in accordance with claim 1 in which the said hollow section of said piston contains near the entrance end thereto compressible material providing an over-all diameter at this end which is slightly greater than the internal diameter of that portion of said tubular body containing said liquid into which said section is to be immersed.

3. A gauge in accordance with claim 1 in which the said hollow section of the said piston has an outer wall precision ground to a diameter corresponding to the internal diameter of the tubular body.

4. A gauge in accordance with claim 1 in which the said hollow section of said piston has connected to its upper part a capillary tubing sealed at its far end and opening into the hollow section at its juncture with said section.

5. A gauge in accordance with claim 4 in with said capillary tubing is calibrated.

6. A gauge in accordance with claim 1 in which said side arm is connected at the top end of said tubular body as an over-flow tube.

7. A pressure gauge for measuring low gas pressures in a system which gauge comprises a tubular body; an opening near the top end of said body for connection of said gauge to said system to be measured; a connection near said top for a tubular side arm; an opening at the top of said tubular body; sealing means in said opening; a piston positioned in and in slideable relationship with said sealing means, said piston comprising a shaft positioned in said sealing means and extending upwardly on the outside of said tubular body and downwardly into said tubular body and having on its lower extremity a hollow member slideable in said tubular body but having an outside diameter slightly greater than the main internal diameter of said tubular body; a tubular side arm, one end being connected at said connection near said top and in passage-way relationship thereat and the other end being joined in passage-way relationship to the bottom of said tubular body; a section in said tubular body near the bottom thereof which section has an inside diameter larger than the main internal diameter of said tubular body; and means for reading the pressure being measured.

8. A gauge in accordance with claim 7 in which said tubular side arm is connected as an over-flow at the said connection near the top of said tubular body.

9. A gauge in accordance with claim 7 in which said hollow member includes a calibrated capillary.

References Cited in the file of this patent

UNITED STATES PATENTS

| | | |
|---|---|---|
| 1,666,739 | Hornberger | Apr. 17, 1928 |
| 1,749,007 | Wales | Mar. 4, 1930 |
| 2,459,759 | Abell | Jan. 11, 1949 |

OTHER REFERENCES

R. G. Nester, "New Device for Measuring Low Gas Pressure," Review of Scientific Instruments, vol. 28, No. 7, July 1957.